May 2, 1967     E. F. MARTIN, JR., ET AL     3,317,250
ACCELERATION SENSITIVE PRESSURE MODULATING VALVE
Filed May 11, 1964
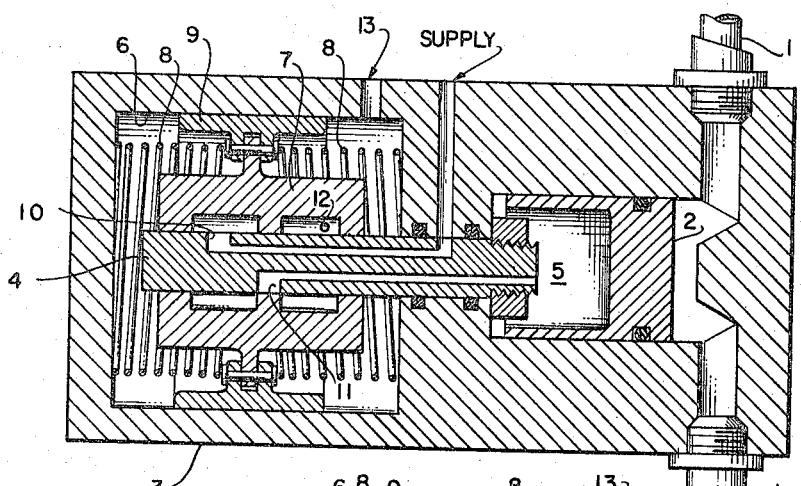
FIG_1
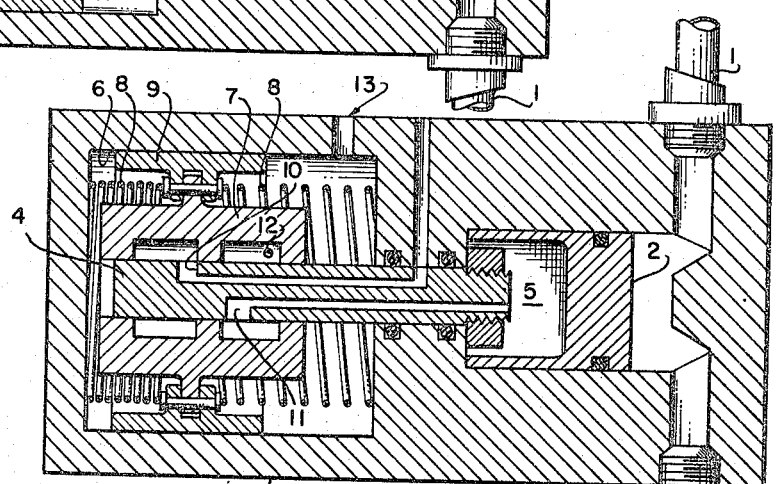
FIG_2
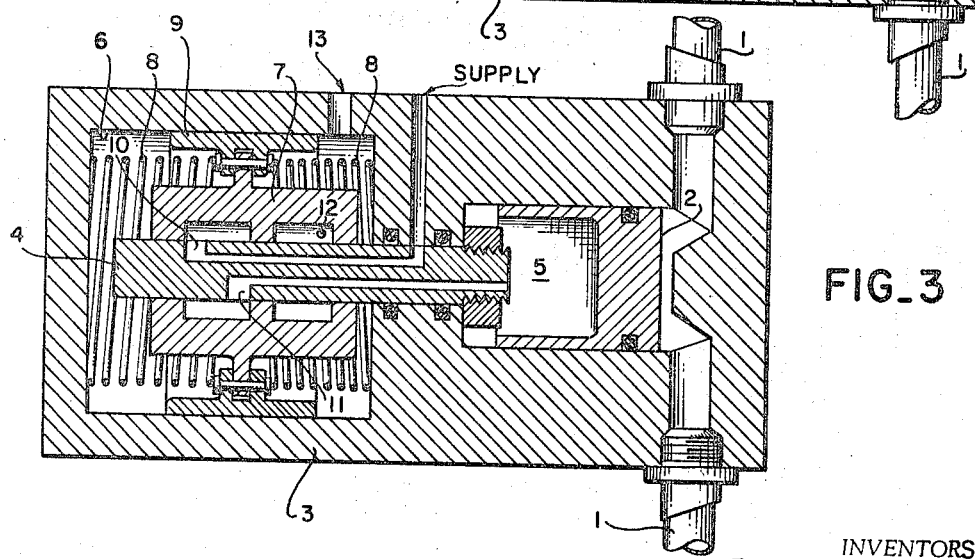
FIG_3
INVENTORS
EDWARD F. MARTIN, JR.,
ROBERT L. RAPP
By *George C. Sullivan*
Agent

United States Patent Office 3,317,250
Patented May 2, 1967

3,317,250
ACCELERATION SENSITIVE PRESSURE
MODULATING VALVE
Edward F. Martin, Jr., Glendale, and Robert L. Rapp, Burbank, Calif., assignors to Lockheed Aircraft Corporation, Burbank, Calif.
Filed May 11, 1964, Ser. No. 366,378
3 Claims. (Cl. 303—24)

This invention relates to an acceleration sensitive pressure modulating valve.

During the landing phase of an aircraft pressure applied to the brake system results in an undersirable oscillation of the landing gear. Previous attempts to reduce or eliminate the problem such as stiffening of the structure, selection of brake materials and the use of drag struts embodying piston dampers have generally been unsuccessful.

The present invention solves the aforementioned problem by varying the pressure to the brakes as a function of the oscillation of the landing gear. In other words, the brakes can be released a definite amount when the gear is accelerating backward and increased when the gear is undergoing forward acceleration. The net result is a damping of the oscillation to an acceptable value.

An object of the invention is to provide an apparatus which utilizes the acceleration and deceleration of an oscillation motion to control the pressure to the unit causing the oscillation.

A further object of the invention is to provide a means for dampening the oscillations of aircraft landing gear.

Another object of the invention is to provide an oscillation damper for an aircraft landing gear which in the event of failure will not disable normal landing operations.

Another object of the invention is to provide a valve for modulating fluid pressure in response to acceleration.

These and other objects of this invention will become readily apparent from the following detailed description on the drawing in which:

FIG. 1 is a lateral view in section of a valve embodying this invention, and wherein the system is depicted as at rest.

FIG. 2 is a sectional view similar to FIG. 1, wherein the inertia mass is displaced to the left.

FIG. 3 is a sectional view similar to FIG. 1, wherein the inertia mass is displaced to the right.

With reference to FIG. 1, the hydraulic pressure in line 1 is to be modulated, in response to variations in acceleration, by movement of the piston 2. As illustrated, a valve body 3 may be provided with a passage through the end thereof which is a continuation of line 1. Movement of the piston in the enlarged cylindrical section of the line passage changes the fluid volume, thereby increasing or decreasing the presence. The valve body 3 has a spool 4 extending from the chamber 5 (back of piston 2) into chamber 6. An inertia mass 7 is free to slide back and forth on the spool against the normal restoring force of the springs 8 through the guide 9. Port 10 in the spool connects a passage from a pressure supply through the spool to an annular cavity in one end of the inertia mass 7. A port 11 extends through the spool to the chamber 5 behind the piston 2. The annular cavity in the other end of the mass 7 is provided with an opening 12 to the chamber 6 which in turn is open to the return flow port 13.

As shown in FIG. 1, the mass 7 is at rest and is centered on the spool by the two springs. It will be noted that the land on the mass 7 is held over port 11. Adjustment of the position of mass 7 over port 11 determines the pressure level in cavity 5. Comparison of this pressure and that in line 1 determines the static position of piston 2.

Assuming an acceleration to the right, the inertia mass tends to remain at rest and relative to the valve body 3 moves to the left as shown in FIG. 2. In this position the land on the mass 7 uncovers port 11. The chamber 5 is connected through the passage in spool 4, port 11, right cavity in inertia 7 mass opening 12 and chamber 6 to the return port 13. The pressure in chamber 5 is now lower than the pressure in line 1 and the piston 2 moves to the left as shown in FIG. 2.

Assuming an acceleration to the left, the inertia mass 7 relative to valve body 3 moves to the right, as shown in FIG. 3. Port 11 is now uncovered and opens into the cavity in the left end of mass 7. Thus, it is readily seen that the pressure from the supply is applied through the port 10 to the cavity, and through port 11 to chamber 5, which results in movement of piston 2 to the right, as indicated in FIG. 3.

Thus, it is apparent that acceleration of the body at a magnitude depending on the weight of the mass and the centering force of the springs causes the mass to move on the spool. This displacement of the mass with respect to the spool exposes the chamber side of the piston to high or low pressure, depending on the mass position. This pressure (high) or loss (low) of pressure moves the piston back and forth, thereby increasing or decreasing the pressure being controlled by an amount depending on the volume characteristics of the controlled pressure and the volume setting of the piston.

By mounting a valve assembly such as described on an aircraft landing gear in a position that it is subject to the oscillation of the gear and by selecting the proper mass, spring force and piston volume, the brakes can be released an amount when the gear is accelerating backward and increased when the gear is accelerating forward. It is readily seen that in the event of valve failure, the piston will remain in one of the noted positions and normal braking operations are not disabled.

While the aforementioned parameters are not critical, consideration should be given to the selection of optimum ranges for acceptable performance. For example, if the volume of the piston displacement is too large with respect to the brake or controlled volume, the pressure pulse may not be very large but the modulating brake or controlled pressure may add to the natural oscillation and have a detrimental effect (improper phase relationship). On the other hand, too small a piston volume may change the braking or controlled pressure so little as to be ineffective. Damping of the mass movement is controlled by the clearance between the mass and the spring guides. Also normal deceleration in addition to acceleration due to oscillation may make it advisable for maximum effectiveness to have one of the centering spring forces larger than the other. By caging of the springs to a predetermined preload the sensitivity of the valve may be controlled.

Even though the invention has been described in connection with brake pressure for aircraft it should be clearly understood that the invention is not so limited. It should be readily apparent that there are many applications where it is desirable to control oscillations which are set up as the result of an applied fluid pressure.

While a specific embodiment of the invention has been shown and described, it should be understood that certain alterations, modifications and substitutions may be made to the instant disclosure without departing from the spirit and scope of the invention as defined by the appended claims.

What is claimed is:

1. A pressure modulating valve comprising a valve body, a first chamber in one end of said body, a line in which pressure is to be modulated connected to said first chamber, a piston located in said chamber and having one end thereof exposed to the pressure to be modulated, a second chamber in the other end of said body, a spool extending from said first chamber into said second chamber, an inertia mass mounted on said spool and having first and second annular cavities therein separated by a land, a first port in said spool normally covered by said land and extending through the spool to said first chamber and against the other end of said piston, a second port in said spool extending from one of said cavities through at least a portion of said spool to a pressure supply.

2. The modulating valve as defined in claim 1 and including
a pair of springs for centering the annular land over said first port when the valve body is at rest.

3. A pressure modulating valve comprising a line in which pressure is to be controlled, said line having an enlarged section, a high pressure supply, valve means including an inertia device responsive to acceleration for varying said high pressure supply to the enlarged section, a piston located in the enlarged section between the high pressure supply and the pressure to be controlled, said device responsive to acceleration in one direction to operate said valve to release pressure from the piston and responsive to acceleration in the other direction to increase pressure to the piston and resilient biasing means for restoring said device to a high pressure cut-off position when said device is at rest.

References Cited by the Examiner
UNITED STATES PATENTS 2,183,002 12/1939 Bach _____ 73—515
2,759,570 8/1956 Shirey _____ 188—181

EUGENE G. BOTZ, *Primary Examiner.*